(12) United States Patent
Inotsuka

(10) Patent No.: US 7,488,178 B2
(45) Date of Patent: Feb. 10, 2009

(54) ROTARY CONNECTOR DEVICE WITH ARCUATELY OVERLAPPING FIRST AND SECOND CUTTER PORTIONS

(75) Inventor: Tetsuya Inotsuka, Tokyo (JP)

(73) Assignee: Niles Co., Ltd (JP)

( * ) Notice: Subject to any disclaimer, the term of this patent is extended or adjusted under 35 U.S.C. 154(b) by 0 days.

(21) Appl. No.: 11/892,067

(22) Filed: Aug. 20, 2007

(65) Prior Publication Data

US 2008/0057741 A1  Mar. 6, 2008

(30) Foreign Application Priority Data

Aug. 23, 2006 (JP) ............................... 2006-227189

(51) Int. Cl.
*H01R 39/00* (2006.01)

(52) U.S. Cl. ........................................................ 439/15

(58) Field of Classification Search .................. 439/15, 439/13, 16, 164, 166, 404, 392, 395, 396, 439/492

See application file for complete search history.

(56) References Cited

U.S. PATENT DOCUMENTS

| 4,744,763 | A | * | 5/1988 | Suzuki et al. | ................. 439/15 |
| 4,824,396 | A | * | 4/1989 | Sasaki et al. | ................ 439/475 |
| 4,838,803 | A | * | 6/1989 | Kondo | ........................ 439/164 |
| 4,930,716 | A | * | 6/1990 | Bannai | ...................... 242/407 |
| 5,393,007 | A | * | 2/1995 | Urushibata | .................. 242/532 |

* cited by examiner

*Primary Examiner*—Chandrika Prasad
(74) *Attorney, Agent, or Firm*—Rader Fishman & Grauer PLLC; Ronald P. Kananen

(57) ABSTRACT

A cover slide wall has a first cutter portion and a second cutter portion integrally formed therewith. The first and the second cutter portions have an overlap area and oppositely directed cutter edges on the circumference via a first insertion gap for communicating a radial inside and a radial outside. A holder faces the outer periphery of the second cutter portion at the radial outside via a second insertion gap. The flat cable is inserted from the stationary terminal portion into the second insertion gap, and folded back at the cutter edge of the second cutter portion so as to be wired from the cutter edge of the first cutter portion 13 to the inside of the cover slide wall through the first insertion gap.

4 Claims, 5 Drawing Sheets

[Fig.1]
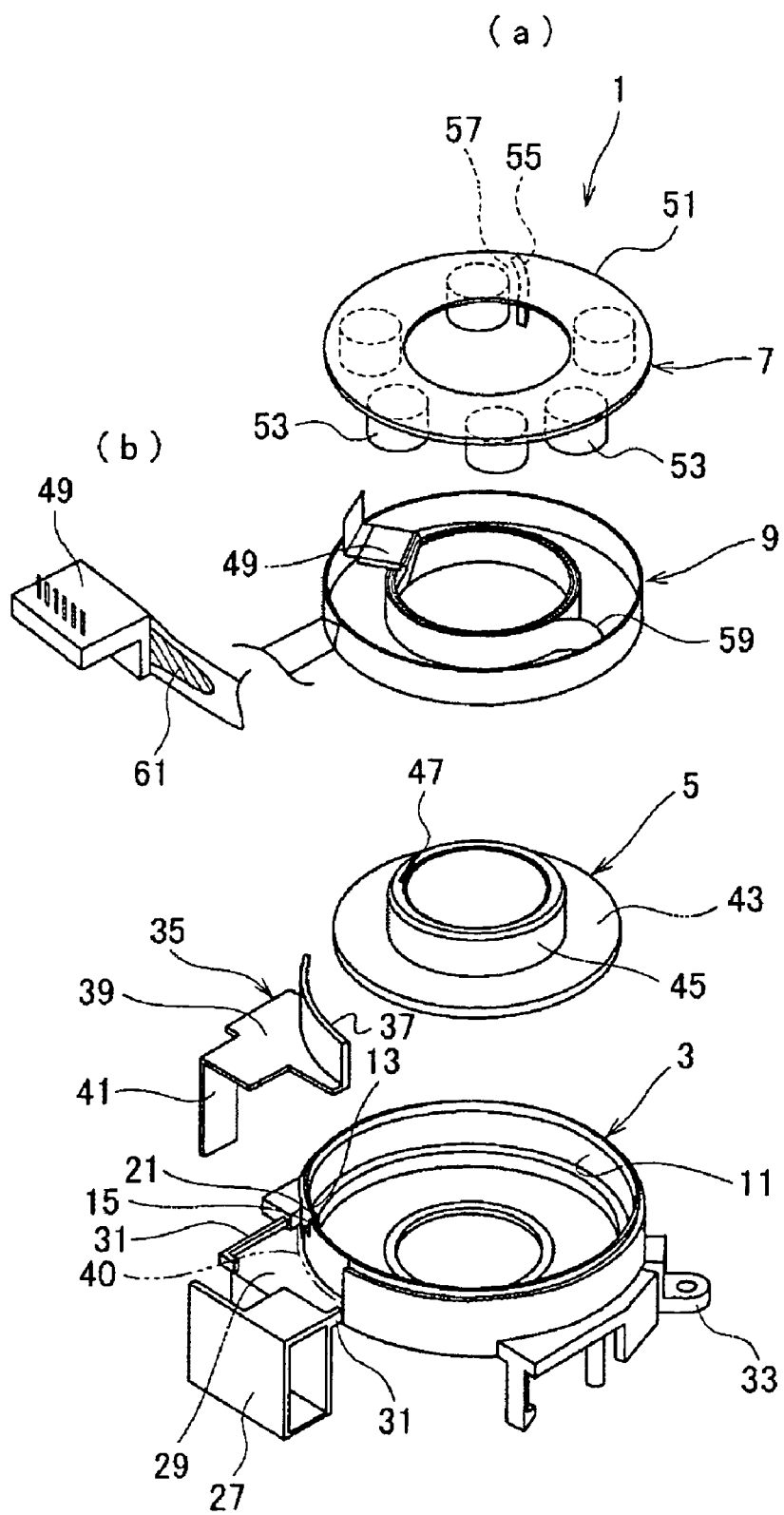

[Fig.2]
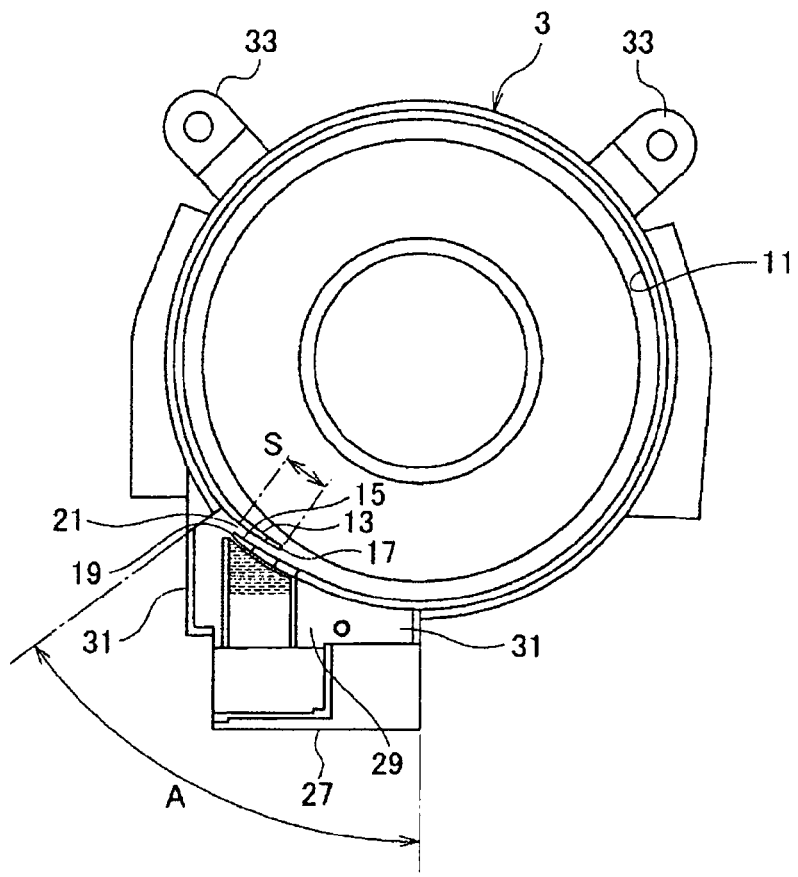
[Fig.3]
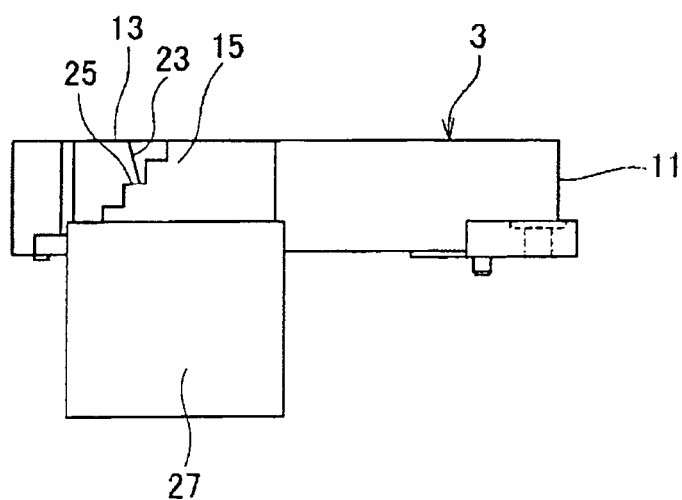

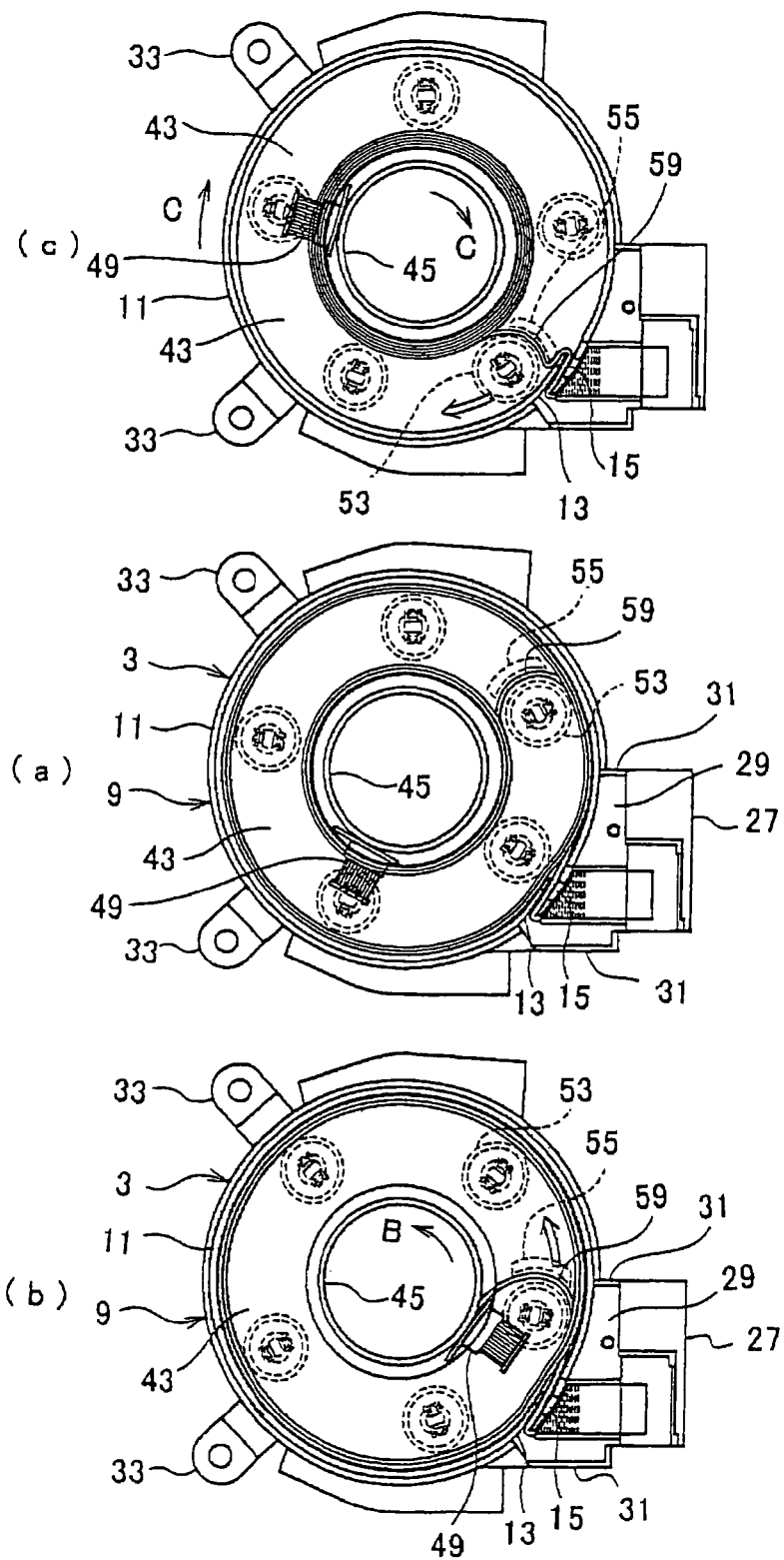
[Fig.4]

[Fig.5]
(a)
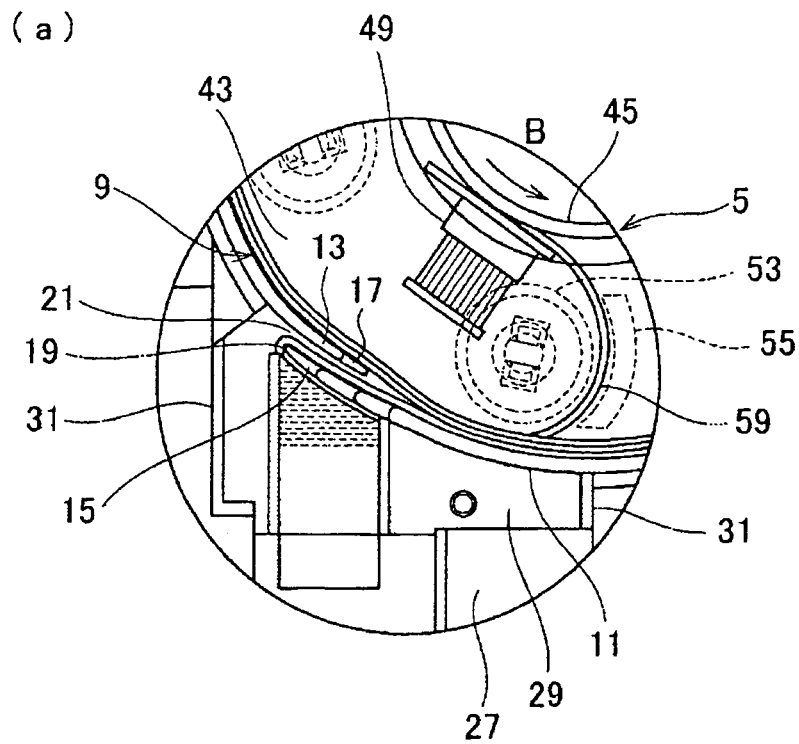
(b)
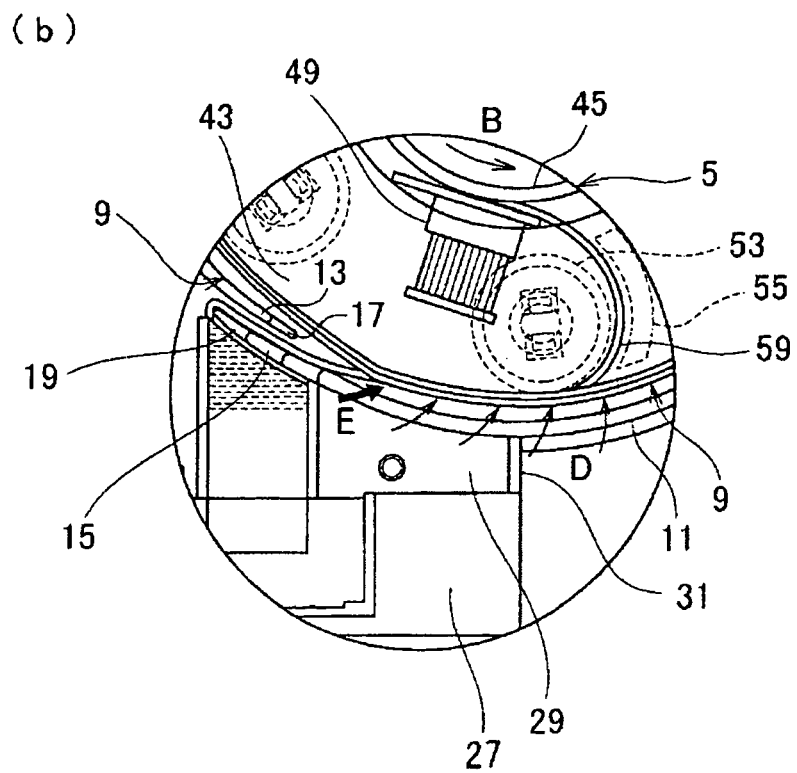

[Fig.6]
(a)
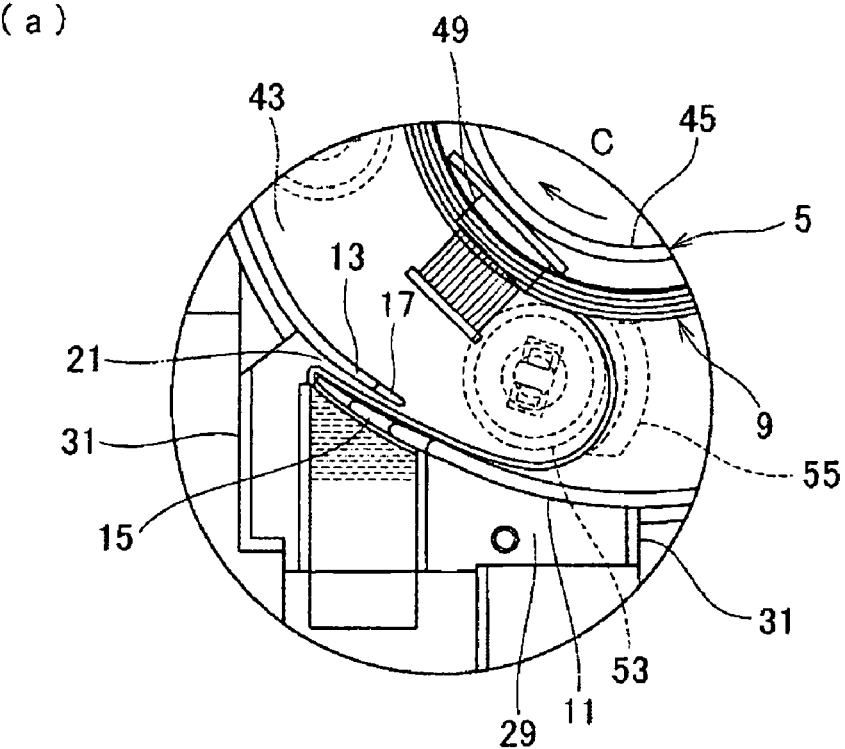
(b)
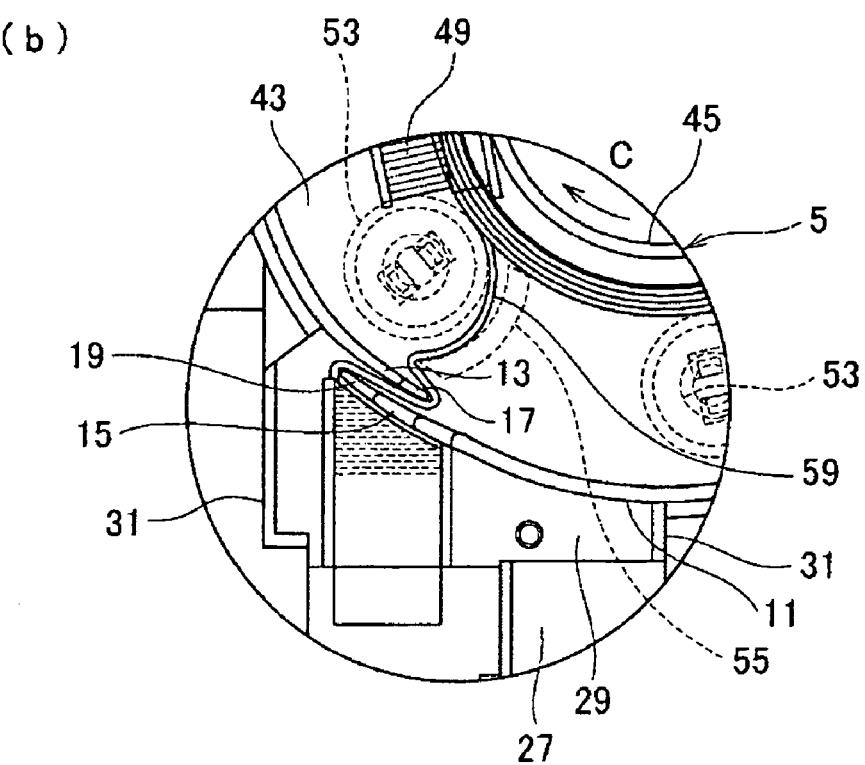

ROTARY CONNECTOR DEVICE WITH ARCUATELY OVERLAPPING FIRST AND SECOND CUTTER PORTIONS

BACKGROUND OF THE INVENTION

1. Technical Field

The present invention relates to a rotary connector device employed for electrically coupling a body of an automobile and a steering wheel.

2. Background Art

In a generally employed rotary connector device as disclosed in Japanese Unexamined Patent Application No. H08-192960 and Japanese Unexamined Utility Model Application No. H01-161589, for example, the neutral position of the steering wheel in the rotary range may be shifted in one direction resulting from the assembly error, which causes the flat cable to be wound by a predetermined amount or more during the operation of the steering wheel.

The aforementioned conventional device employs two separate cutters or a single movable cutter to cut the flat cable during the operation of either left or right steering wheel.

The device provided with the two separate cutters results in the increased number of parts, and complicated assembly and parts control, thus interfering the cost reduction.

The device provided with the movable single cutter also results in the increased number of parts for the movable structure, and complicated assembly and parts control, thus interfering the cost reduction.

SUMMARY OF THE INVENTION

It is an object of the invention to provide a rotary connector system to reduce the number of parts, and simplify assembly and parts control for realizing the cost reduction.

In the present invention, the cover slide wall has a first cutter portion and a second cutter portion integrally formed therewith. The first and the second cutter portions have an overlap area and oppositely directed cutter edges on the circumference via a first insertion gap for communicating a radial inside and a radial outside. A holder faces the outer periphery of the second cutter portion at the radial outside via a second insertion gap. The flat cable is inserted from the stationary terminal portion into the second insertion gap, and folded back at the cutter edge of the second cutter portion so as to be wired from the cutter edge of the first cutter portion to the inside of the cover slide wall through the first insertion gap.

In the rotary connector device according to the invention as described above, when the rotor rotates in the other direction to cause the flat cable to be wound around the slide wall by a predetermined amount or more, the flat cable is pushed against the cutter edge of the second cutter portion so as to be cut.

In the state where the flat cable is wound by a predetermined amount or more in either direction, the first or the second cutter portion integrally formed on the cover slide wall serves to cut the flat cable, thus reducing the number of parts. This makes it possible to reduce the number of parts, and simplify the assembly and parts control for realizing the cost reduction.

The invention realizes the object of the invention to reduce the number of parts, and simplify the assembly and the parts control for the cost reduction by integrally forming the first and the second cutter portions on the cover slide wall of the bottom cover.

BRIEF DESCRIPTION OF THE DRAWINGS

FIG. 1 schematically shows a rotary connector device, wherein FIG. 1(a) is an exploded perspective view of the entire device, and FIG. 1(b) is an enlarged perspective view of a rotary terminal (First embodiment).

FIG. 2 is a plan view of a bottom cover (First embodiment).

FIG. 3 is a side view of the bottom cover (First embodiment).

FIG. 4(a) is a plan view showing a neutral position viewed from the steering wheel, FIG. 4(b) is a plan view showing the counterclockwise rotation state, and FIG. 4(c) is a plan view showing the clockwise rotation state (First embodiment).

FIG. 5(a) is a plan view showing an enlarged essential portion of the counterclockwise rotation state viewed from the steering wheel, and FIG. 5(b) is a plan view showing an enlarged essential portion of the counterclockwise rotation by a predetermined amount or more (First embodiment).

FIG. 6(a) is a plan view showing an enlarged essential portion of a clockwise rotation viewed from the steering wheel, and FIG. 6(b) is a plan view showing an enlarged essential portion of the clockwise rotation by a predetermined amount or more (First embodiment).

FIRST EMBODIMENT

[Rotary Connector Device]

FIG. 1 schematically shows a rotary connector device as a first embodiment of the invention, wherein FIG. 1(a) is an exploded perspective view of the entire device, and FIG. 1(b) is an enlarged perspective view of the terminal at the rotary side. FIG. 2 is a plan view of the bottom cover. FIG. 3 is a side view of the bottom cover.

The rotary connector device 1 shown in FIGS. 1 to 3 is employed for electrically coupling a predetermined device at the steering wheel of the automobile and a power source at the automobile body.

The rotary connector device 1 includes a bottom cover 3, a rotor 5, a loose-fit spacer 7, and a flat cable 9. The bottom cover 3 formed of a resin material is supported at the stationary side of the automobile body. In the embodiment, the stationary side of the automobile body corresponds to a base of a combination switch fixed onto the steering column.

The bottom cover 3 formed of the resin material includes a cover slide wall 11 as an annular slide wall. A first cutter portion 13 and a second cutter portion 15 are integrally formed on the cover slide wall 11. The first and the second cutter portions 13 and 15 include cutter edges 17 and 19 which are oppositely directed on the circumference, respectively. A first insertion gap 21 is formed between the first and the second cutter portions 13 and 15. Each of the first and the second cutter portions 13 and 15 has an overlap area S on the circumference (see FIG. 2). The cutter edge 17 of the first cutter portion 13 at the inner periphery is formed into a linear inclined portion 23. The cutter edge 19 of the second cutter portion 15 at the outer periphery is formed into a stepped inclined portion 25.

The cover slide wall 11 has a predetermined circumferential range A including the area where the first and the second cutter portions 13 and 15 are formed, which is the other portion such that the hole is formed therein.

The cover slide wall 11 has a predetermined circumferential range A including the area where the first and the second cutter portions 13 and 15 are formed, which is than the other portion such that the hole is formed therein.

A terminal support portion 27 provided at the outer periphery of the second cutter portion 15 supports the stationary terminal for connecting the terminal portion of the flat cable to be described later. The stationary terminal is connected to the power source.

A holder assembly 29 is interposed between the outer periphery of the second cutter portion 15 and the terminal support 27. The holder assembly 29 is provided with a protruding frame portion 31 at an outer side.

The bottom cover 3 provided with mount tongue portions 33 is fixed in abutment on a base of the combination switch by tightening bolts inserted through the corresponding tongue portions 33 with nuts.

The holder assembly 29 is combined with a resin holder 35 including a support wall 37 and a mount portion 39. The support wall 37 is curved conforming to the curved outer peripheral side of the second cutter portion 15 opposite the outer periphery of the second cutter portion 15 via a second insertion gap 40. The mount portion 39 is detachably supported at the bottom cover 3, and combined with the holder assembly 29 of the bottom cover 3 so as to be fit with a frame 31 for positioning. The mount portion 39 is integrally provided with a cover 41 to partially cover the terminal support 27.

The rotor 5 is formed of a resin doughnut-like plate 43 and a cylindrical rotor slide wall 45 having a slit 47 formed therein. The slit 47 receives a rotary terminal 49 at the rotary side of the flat cable 9. The rotor 5 is contained to be rotatably supported in the slide wall 11 of the bottom cover 3, and is connected to the steering wheel as the rotary side so as to be rotatable.

The loose-fit spacer 7 formed of a resin material includes doughnut-like plate portion 51 and a plurality of roller portions 53, for example, six roller portions 53. A guide wall 55 is formed to face one of the roller portions 53. An inverse insertion portion 57 is formed as a curved slit between the roller 53 and the guide wall 55. The loose-fit spacer 7 is disposed between the bottom cover 3 and the rotor 5 to be loosely turnable accompanied with the rotation of the rotor 5. The loose-fit spacer 7 is assembled such that the rollers 53 locate around a rotor slide wall 45 in the cover slide wall 11 of the bottom cover 3.

The flat cable 9 includes a rotary terminal 49 for jointing the terminal portion at the rotary side, a stationary terminal supported at the terminal support 27, and an intermediate inverse portion 59 which displaces in response to the rotation of the rotor 5 at the intermediate position. A guide member 61 for preventing the buckling is attached to the rotary terminal 49 of the flat cable 9. The guide member 61 formed of a PET resin film and the like with relatively higher rigidity for suppressing the buckling of the flat cable 9 is applied thereto. The entire portion of the terminal joined with the rotary terminal 49 may be formed as the guide member 61.

The flat cable 9 supports the stationary terminal which allows the terminal support 27 of the bottom cover 3 to be connected to the power source, and the rotary terminal 49 which allows the slit 47 of the rotor 5 to be connected to the electric unit at the steering wheel side. The electric unit at the steering wheel side includes an airbag device or an alarm disposed at the steering wheel, downshifting and upshifting switches of the automatic transmission, a switch for an ASCD (cruise control unit), an audio switch and the like.

The flat cable 9 passes from the stationary terminal over the holder assembly 29, and raised to stand at the second insertion gap 40. The flat cable 9 inserted through the second insertion gap 40 is folded back with the cutter edge 19 of the second cutter portion 15, so as to be wired from the cutter edge 17 of the first cutter portion 13 to the inside of the cover slide wall 11 through the first insertion gap 21. The flat cable 9 inserted through the second insertion gap 40 is gripped between the outer periphery of the second cutter portion 15 and the support wall 37 of the holder 35.

The flat cable 9 has the intermediate inverse portion 59 inserted in and inverted through the inverse insertion portion 57 of the loose-fit spacer 7. It further reaches the rotary terminal 49 at the side of the rotor 5. The flat cable 9 is wound around the bottom cover 3 and the rotor 5 via the intermediate inverse portion 59.

[Rotating Operation]

FIG. 4 shows the rotating direction of the rotor 5. That is, FIG. 4(a) is a plan view of a neutral position, FIG. 4(b) is a plan view during the counterclockwise rotation, and FIG. 4(c) is a plan view during the clockwise rotation when viewed from the steering wheel side, respectively. FIG. 5(a) is a plan view showing an enlarged essential portion during the counterclockwise rotation when viewed from the steering wheel. FIG. 5(b) is a plan view showing an enlarged essential portion during the counterclockwise rotation by a predetermined amount or more. FIG. 6(a) is a plan view showing an enlarged essential portion during the clockwise rotation. FIG. 6(b) is a plan view showing an enlarged essential portion during the clockwise rotation at a predetermined amount or more.

Referring to FIG. 4(a), at the neutral position of the steering wheel, the flat cable 9 is wound around the inner periphery of the cover slide wall 11 of the bottom cover 3 and the outer periphery of the rotor slide wall 45 of the rotor 5.

When the steering wheel is operated to rotate the rotor 5 counterclockwise from the neutral position to the arrow B direction as shown FIG. 4(b), the portion of the flat cable 9 wound around the rotor slide wall 45 is unreeled to the cover slide wall 11 while being guided by the inverse insertion portion 57. Simultaneously, the guide wall 55 of the loose-fit spacer 7 is pushed by the intermediate inverse portion 59 of the flat cable 9 so as to rotate the loose-fit spacer 7 at the speed lower than that of the rotor 5. As the flat cable 9 is unreeled to the cover slide wall 11, it is wound around the inner periphery of the cover slide wall 11 of the bottom cover 3. When the rotor S rotates counterclockwise by a predetermined amount or more, the flat cable 9 is brought into tight contact with the cover slide wall 11.

During the counterclockwise rotation, the intermediate inverse portion 59 of the flat cable 9 pushes the guide wall 55 of the loose-fit spacer 7. The reaction force acts on the proximal end portion of the rotary terminal 49 of the flat cable 9. The reaction force is received by the guide member 61 for preventing the bucking, thus suppressing the buckling of the flat cable 9 to realize the smooth operation.

When the steering wheel is operated to rotate the rotor 5 clockwise from the neutral position shown in FIG. 4(a) to the arrow C direction as shown in FIG. 4(c), the portion of the flat cable 9 wound around the cover slide wall 11 is unreeled to the rotor slide wall 45 while being guided through the inverse insertion portion 57. Simultaneously, the roller portion 53 of the loose-fit spacer 7 is pushed by the intermediate inverse portion 59 of the flat cable 9 such that the loose-fit spacer 7 is turned at the speed lower than that of the rotor 5. As the flat cable 9 is unreeled to the rotor slide wall 45, it is wound around the outer periphery of the rotor slide wall 45. When the rotor 5 rotates clockwise at a predetermined amount, the flat cable 9 is brought into tight contact with the rotor slide wall 45.

In the aforementioned operation, electricity is applied to the steering wheel from the power source via the flat cable 9 so as to apply electricity to the airbag device or the alarm mounted on the steering wheel, the downshifting and upshifting switches of the automatic transmission, the switch for ASCD (cruise control unit), the audio switch and the like irrespective of the operation of the steering wheel.

[Cutting Operation]

When the neutral position of the steering wheel in the rotary range shown in FIG. 4(a) is shifted in one direction resulting from the assembly failure, the flat cable 9 may be wound by a predetermined amount or more during the operation of the steering wheel.

In the case where the amount of the flat cable wound around the cover slide wall 11 is large at the neutral position, when the rotor 5 rotates counterclockwise by a predetermined amount or more to the arrow B direction as shown in FIG. 4(b) and FIG. 5(a), the flat cable 9 is brought into tight contact with the cover slide wall 11. When the rotor 5 further rotates from the aforementioned position, the flat cable 9 moves to the arrow D direction as shown in FIG. 5(b) so as to be wound around the outer periphery of the roller portion 53. As the flat cable 9 is wound around in the aforementioned manner, it entirely rotates to receive the tensile force in the arrow E direction. The tensile force causes the flat cable 9 to be pushed against the cutter edge 19 of the second cutter portion 15. The flat cable 9 is cut when the force becomes a predetermined level or higher.

In this case, even if the guide member 61 for preventing the buckling is provided at the proximal end of the rotary terminal 49 as described above, the flat cable 9 is cut at the bottom cover 3. The guide member 61 with high rigidity does not have to be cut, thus allowing the flat cable 9 to be cut easily and smoothly.

In the case where the amount of the flat cable around the rotor slide wall 45 at the neutral position is large, when the rotor 5 rotates clockwise by a predetermined amount or more to the arrow B direction as shown in FIG. 4(c) and FIG. 6(a), the flat cable 9 is brought into tight contact with the rotor slide wall 45. When the rotor 5 further rotates at the aforementioned position, the flat cable 9 abuts on the first cutter portion 13 as shown in FIG. 6(b), and deformed into an S-like shape and receives the tensile force. The tensile force pushes the flat cable 9 against the cutter edge 17 of the first cutter portion 13. The flat cable 9 is cut when the tensile force reaches the predetermined level or higher.

In the rotary connector device 1 of the present embodiment, the cover slide wall 11 has a first cutter portion 13 and a second cutter portion 15 integrally formed therewith. The first and the second cutter portions 13 and 15 have an overlap area S and oppositely directed cutter edges 17 and 19 on the circumference via a first insertion gap 21 for communicating a radial inside and a radial outside. A holder 35 faces the outer periphery of the second cutter portion 15 at the radial outside via a second insertion gap 40. The flat cable 9 is inserted from the stationary terminal portion into the second insertion gap 40, and folded back at the cutter edge 19 of the second cutter portion so as to be wired from the cutter edge of the first cutter portion 15 to the inside of the cover slide wall 11 through the first insertion gap 21. When the rotor 5 rotates in one direction to cause the flat cable 9 to be wound around the rotor slide wall 45 by a predetermined amount or more, the flat cable 9 is pushed against the cutter edge 17 of the first cutter portion 13 to be cut. When the rotor 5 rotates in the other direction to cause the flat cable 9 to be wound around the cover slide wall 11 by a predetermined amount or more, the flat cable 9 is pushed against the cutter edge 19 of the second cutter portion 15 so as to be cut.

In the case where the flat cable 9 is wound around in either the direction by a predetermined amount or more, it may be cut by the first cutter portion 13 or the second cutter portion 15 integrally mounted on the cover slide wall 11, resulting in reduced number of parts. This makes it possible to reduce the number of parts, and simplify the assembly and parts control for realizing the cost reduction.

The holder 35 includes a support wall 37 which is curved conforming to the curved outer periphery of the second cutter portion 15, and a mount portion 39 for detachably supporting the support wall 37 at the bottom cover 3. The flat cable 9 which is inserted through the second insertion gap 40 is gripped between the outer periphery of the second cutter portion 15 and the support wall 37 of the holder 35. When the flat cable 9 is wound by a predetermined amount or more, it may be pushed against the cutter edges 17 and 19 of the first and the second cutter portions 13 and 15 so as to be cut.

The guide member 61 for preventing the buckling is disposed at the rotary terminal 49 of the flat cable 9 supported at the rotor 5. When the rotor 5 rotates to cause the flat cable 9 to be wound around the cover slide wall 11, the buckling of the flat cable 9 may be suppressed. The second cutter portion 15 at the bottom cover 3 is allowed to cut the flat cable 9 easily and smoothly irrespective of the guide member 61.

The holder 35 partially faces the outer periphery of the second cutter portion 15 rather than faces by plane such that the flat cable 9 is pushed against the cutter edge 19 of the second cutter portion 15.

The invention claimed is:

1. A rotary connector device, comprising:
a bottom cover having an annular cover slide wall,
a rotor rotatable with respect to the bottom cover and having a rotating portion,
a loose-fit spacer interposed between the bottom cover and the rotor, the loose-fit spacer having an inverse insertion portion in a form of a curved slit, the loose-fit spacer being loosely turnable with rotation of the rotor, and
a flat cable having a stationary terminal portion connected to a power source supported at the bottom cover and a rotary terminal portion connected to an electric unit at the rotor, the flat cable being wound around the rotor and disposed between the bottom cover and the rotor, the flat cable having an intermediate inverse portion inserted through the inverse insertion portion of the loose-fit spacer so as to be inverted, wherein:
the cover slide wall has a first cutter portion and a second cutter portion integrally formed therewith, the first and the second cutter portions arcuately overlap one another to define oppositely directed cutter edges, the first and second cutter portions disposed radially apart from one another to define a first insertion gap therebetween;
a holder faces an outer periphery of the second cutter portion and is disposed apart therefrom to define a second insertion gap; and
the flat cable is inserted from the stationary terminal portion into the second insertion gap, and folded back at the cutter edge of the second cutter portion so as to be wired from the cutter edge of the first cutter portion to the inside of the cover slide wall through the first insertion gap.

2. The rotary connector device according to claim 1, wherein:
the holder includes a support wall which is curved conforming to a curved outer periphery of the second cutter portion, and a mount portion for detachably supporting the support wall at the bottom cover; and the flat cable inserted through the second insertion gap is interposed between the outer periphery of the second cutter portion and the support wall of the holder.

3. The rotary connector device according to claim 1, further comprising a guide member for preventing buckling of the flat cable, the guide member provided at the rotary terminal portion of the flat cable supported at the rotor.

4. The rotary connector device according to claim 2, further comprising a guide member for preventing buckling of the flat cable, the guide member provided at the rotary terminal portion of the flat cable supported at the rotor.

* * * * *